No. 678,836. Patented July 16, 1901.
J. FIKE.
HOUSE MOVING TRUCK.
(Application filed Feb. 6, 1901.)
(No Model.)
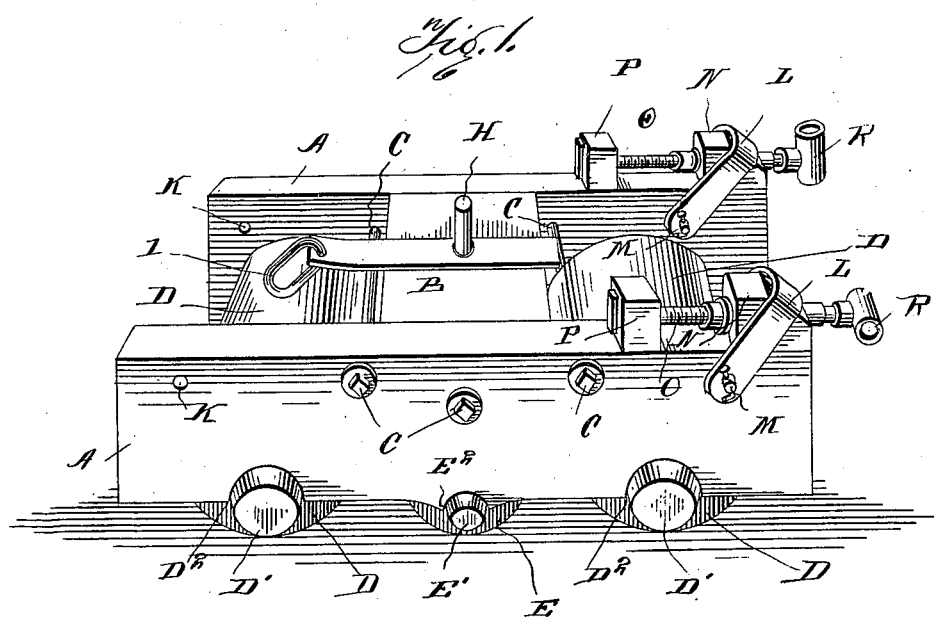
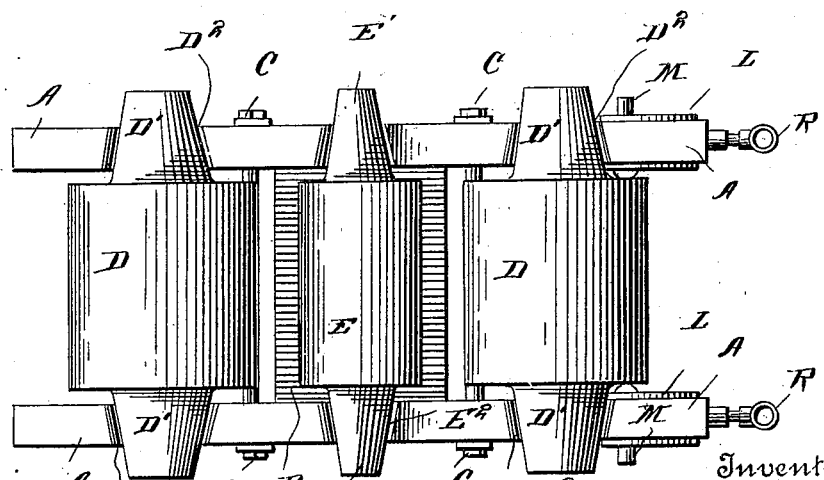
Witnesses
Chas. K. Davies.
Paul B. McFarland.
Inventor
John Fike
By W. A. Bartlett
Attorney

UNITED STATES PATENT OFFICE.

JOHN FIKE, OF LEIPSIC, OHIO.

HOUSE-MOVING TRUCK.

SPECIFICATION forming part of Letters Patent No. 678,836, dated July 16, 1901.

Application filed February 6, 1901. Serial No. 46,238. (No model.)

*To all whom it may concern:*

Be it known that I, JOHN FIKE, residing at Leipsic, in the county of Putnam and State of Ohio, have invented certain new and useful Improvements in House-Moving Trucks, of which the following is a specification, reference being had therein to the accompanying drawings.

This invention relates to trucks for moving buildings.

The object of the invention is to produce a truck wherein the rollers are to a considerable extent self-adjusting; also, to improve the mechanism by which the truck may be placed in oblique position or "canted."

Figure 1 is a perspective view of a truck according to this invention. Fig. 2 is a bottom plan of the same.

Trucks for moving houses are common. Usually at least four such trucks are placed under heavy timbers, on which timbers the house rests. The rollers of the trucks rest on some kind of a track, usually made of planks or timbers.

In the present invention the truck proper has two side pieces A A and a cross-piece B, which pieces are of heavy plank and secured together by cross-bolts C, thus making a heavy frame in the form of a letter H. Grooves $D^2$ $D^2$ are made in the lower part of the bars A, which grooves act as boxes for the journals of rolls D D. The two rolls D D are near the ends of the truck and are equal in size. The journals or spindles D' of these rolls are frusto-conical in form, and the bearings or boxes in the frame-pieces A correspond to the form of these journals in a general way; but the cylindrical part of the rollers D is less in length than the distance between the frame-pieces A A, and the bearing in the frame-piece is large enough to receive the large part of the frustum D'. The frame is applied to the rolls D with the spindles D' resting in bearings $D^2$. A spindle H projects upward from the cross-bar B and may enter a hole in the timber placed thereon or in the sill of a house or in any suitable cap, as is common. This spindle centers the truck under its load; but the rolls D being free to move endwise to a limited extent between the side pieces A A will adjust themselves to inequalities in the way or bed in a manner somewhat similar to the adaptation of the wheels of a railway-car to the curves in the road-bed.

The truck may be used with only the frame and rollers D D; but by preference a smaller roller E is interposed between the rolls D D. This roller E is of the same general form as rolls D and has spindles E' resting in bearings $E^2$. The bearings for roller E will be a little lower than the bearings for rolls D to compensate for difference in diameter. The roller E then becomes a center and rolls D are to an extent relieved of their loads and the truck can be more closely "cut" or canted than if roller E be omitted.

A draw-bar or link I serves for connection to the draft mechanism when needful. Generally the draft mechanism is applied to the house, which rests on the trucks. A much larger number than four trucks may be employed in moving large houses or buildings.

To enable the truck to be cut or canted, I preferably apply to at least one of the frame-pieces A a cant-screw constructed as follows: Near each corner of the truck holes K are bored through the blocks A, and a flat band or clevis L is secured to the block A by bolt M, passed through one of the holes K. This clevis may be turned back into the inclined position shown in Fig. 1 and a nut N held down in the frame by the clevis. Through nut N a screw or jack-screw O extends, and this screw may have a cap or head P, which is swiveled to the end of the screw, as is common in jack-screws. Head P rests on the frame-piece A. The outer end of the screw has an eye for the application of an operating-bar. Only one clevis and screw attachment is generally necessary, although two may be employed. The cant-screws may be placed at either end of the truck. By allowing head P to have a bearing against one of the joists of the building, either directly or by the application of an intermediate, pressure applied by the screw will tend to swing the truck about the center H, and so cause the rollers to assume an angular relation to the building, as do the trucks of a wagon or car in turning corners.

It will be seen from the foregoing that this device is capable of use in various ways—that is, with either two or three rolls—and that it may be turned to an angle by a simple attachment. All the parts are simple and can readily be taken apart for removal or storage.

What I claim is—

1. A truck for house-moving, consisting essentially of a frame having parallel side bars, and rollers with frusto-conical spindles resting in corresponding bearings in said bars, so that the shifting of the rollers endwise in the frame will change the relation of the bearings to the frame, substantially as described.

2. A truck for house-moving consisting essentially of two side bars and a cross-bar and means for holding the frame together, roller-bearings for three rollers in the lower face of the side bars, the bearings for the middle roll being at a lower horizontal plane than the bearings for the end rolls, and rollers of unequal size, the middle roll being smaller and resting against the lower bearings, substantially as described.

3. In a house-moving truck, a frame having side bars with holes at the corners, a clevis and bolt for application to either corner, and a cant-screw and nut held in place by the clevis, all combined substantially as described.

4. In a house-moving truck, the combination with the rectangular frame, of a cant-screw attached near one corner of the frame, and in position to bear against an abutment, to cant the truck.

5. The combination with a truck-frame of the character described, of a clevis, a bolt passing through a hole in the truck-frame by which the clevis is held in place, a nut held to the frame by said clevis, a jack-screw passing through said nut, and a cap on the jack-screw resting on the frame-bar, all substantially as described.

In testimony whereof I affix my signature in presence of two witnesses.

JOHN FIKE.

Witnesses:
E. R. EASTMAN,
JOHN D. DILLER.